(12) United States Patent
Kishigami et al.

(10) Patent No.: US 7,190,660 B2
(45) Date of Patent: Mar. 13, 2007

(54) METHOD OF MANUFACTURING OPTICAL PICKUP DEVICE AND OPTICAL PICKUP DEVICE

(75) Inventors: Tomo Kishigami, Tokyo (JP); Nobuo Takeshita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 714 days.

(21) Appl. No.: 10/259,530

(22) Filed: Sep. 30, 2002

(65) Prior Publication Data

US 2003/0174635 A1 Sep. 18, 2003

(30) Foreign Application Priority Data

Mar. 18, 2002 (JP) ............................ P2002-074093

(51) Int. Cl.
G11B 7/00 (2006.01)
(52) U.S. Cl. ...................................... 369/120
(58) Field of Classification Search ................. 29/840, 29/832, 860, 834
See application file for complete search history.

(56) References Cited

U.S. PATENT DOCUMENTS

| RE33,548 | E | 3/1991 | Kime |
| 5,600,131 | A * | 2/1997 | Miura ..................... 250/214.1 |
| 5,628,110 | A * | 5/1997 | Sakaguchi et al. ............ 29/840 |
| 5,647,124 | A * | 7/1997 | Chan et al. .................... 29/840 |
| 6,212,149 | B1 | 4/2001 | Nakata et al. |
| 6,400,664 | B1* | 6/2002 | Shimano et al. ......... 369/44.37 |
| 6,895,661 | B1* | 5/2005 | Gamel et al. .................. 29/740 |
| 2002/0066181 | A1* | 6/2002 | Miyazaki et al. ............. 29/854 |

FOREIGN PATENT DOCUMENTS

| JP | 53-064568 | 2/1978 |
| JP | 61-057313 U | 4/1986 |
| JP | 03-014772 U | 2/1991 |
| JP | 04-003066 A | 1/1992 |

(Continued)

*Primary Examiner*—Wayne Young
*Assistant Examiner*—Lixi Chow
(74) *Attorney, Agent, or Firm*—Birch, Stewart, Kolasch & Birch, LLP

(57) ABSTRACT

In an optical pickup device, a flexible substrate (FPC) (2) and an auxiliary board (4) are fixed to an optical unit (5) with screws (11) before fixing an optical detector (1) to the FPC (2). After that, the optical detector (1) is pressed to the FPC (2) by probes (12), to bring lead portions (1a) into contact with conductor portions (2a). The optical detector 1 is singly moved by the probes (12) in that state, to perform position adjustment of the optical detector (1). Since the friction between the optical detector (1) alone and the FPC (2) is small, the position adjustment can be performed with high accuracy. Further, since the lead portions (1a) and the conductor portions (2a) are in contact with each other, it is possible to perform the position adjustment while observing an electrical signal outputted from the optical detector (1) through the FPC (2). Then, after determining the optimal position of the optical detector (1), the lead portions (1a) and the conductor portions (2a) are fixed to each other by soldering. Through such a manufacturing method, it is possible to improve the accuracy of position adjustment of the optical detector relative to the optical unit and improve the reliability of position of the optical detector after the position adjustment.

8 Claims, 6 Drawing Sheets

FOREIGN PATENT DOCUMENTS

| JP | 05-021682 A | 1/1993 |
| JP | 06-290982 A | 10/1994 |
| JP | 8-7535 Y2 | 3/1996 |
| JP | 2001-101695 A | 4/2001 |
| JP | 2003-141747 A | 5/2003 |
| JP | 2003-141772 A | 5/2003 |
| JP | 2003-272179 A | 9/2003 |

* cited by examiner

METHOD OF MANUFACTURING OPTICAL PICKUP DEVICE AND OPTICAL PICKUP DEVICE

BACKGROUND OF THE INVENTION

1. Field of the Invention

The present invention relates to an optical pickup device used in an optical information recording/playback apparatus, and more particularly to a method of fixing an optical detector thereof.

2. Description of the Background Art

Information recorded on an optical disk as data of digital signals is read by a playback device, and the read operation of the information is performed in an optical pickup device included in the playback device. The optical pickup device, which irradiates the optical disk with an irradiation light emitted from a laser optical source and detects the reflected light from the optical disk to convert it into an electrical signal, has an optical instrument positioned with extremely high accuracy.

FIG. 10 is a plan view showing a background-art optical pickup device disclosed in Japanese Patent Application Laid-Open Gazette No. 8-7535. In FIG. 10, reference numeral 101 denotes an optical detector which receives a light signal which is a reflected light from an optical disk (in the present description, for convenience of discussion, the reflected light from an optical disk is sometimes referred to simply as "reflected light") and converts the light signal into an electrical signal corresponding thereto, and reference sign 101a denotes a lead portion for outputting the electrical signal from the optical detector 101. Reference numeral 102 denotes a flexible substrate (hereinafter, referred to as "FPC") having a conductor portion 102a to which the electrical signal outputted from the lead portion 101a of the optical detector 101 is inputted, and the lead portion 101a is fixed to the conductor portion 102a by soldering with a solder portion 103. Numeral 104 denotes an adjustment board made of, e.g., iron onto which the FPC 102 is attached with a not-shown adhesive layer, and numeral 105 denotes an optical unit in which not-shown optical parts and the like are provided. Numeral 106 denotes a first adhesive of UV light hardening type which is applied in dots and hardened for quick hardening. Numeral 107 denotes a second adhesive made of two-part epoxy, which is applied and hardened on the first adhesive 106 so as to cover it and further around the adjustment board 104 like beads.

FIG. 11 is a sectional side elevation showing the background-art optical pickup device of FIG. 10. In FIG. 11, constituent elements identical to those of FIG. 10 are represented by the same reference signs. Further, reference signs 104a and 105a represent light-transmitting holes, and a reflected light 108 from a not-shown optical disk enters the optical detector 101 through the light-transmitting holes 104a and 105a.

The optical detector receives the reflected light 108 from the optical disk and outputs the information recorded on the optical disk as an electrical signal. Further, the optical detector also detects the misalignments of a light spot relative to the optical disk in a focus direction and a tracking direction and outputs the information of misalignment as an electrical signal. The information on the misalignments of the light spot is inputted to a not-shown objective lens actuator and used for a correction of the position of the light spot.

It is necessary to accurately focus the reflected light 108 on a light receiving surface of the optical detector 101 and therefore fix the optical detector 101 to a position adjusted relative to the optical unit 105 with high accuracy.

In the background-art process of manufacturing the optical pickup device, since the optical detector 101 is already soldered onto the FPC 102 attached onto the adjustment board 104 at the time of position adjustment, the position adjustment of the optical detector 101 is performed by moving the adjustment board 104 on which the optical detector 101 is fixed relatively to the optical unit 105. Usually, this position adjustment is performed while the electrical signal outputted from the optical detector 101 is observed through the FPC 102, and the optimal position of the optical detector 101 is determined on the basis of the electrical signal.

After determining the position of the optical detector 101, a small amount of first adhesive 106 is applied between the adjustment board 104 and the optical unit 105 and hardened by short-time ultraviolet irradiation. Further, the second adhesive 107, i.e., the two-part epoxy, is applied and slowly hardened, taking a time ranging from several minutes to several hours, to fix the adjustment board 104 to the optical unit 105.

In the above case of position adjustment of the optical detector 101, however, since there is a large friction between the adjustment board 104 and the optical unit 105, it is hard to make a fine adjustment thereof and therefore difficult to improve the accuracy in position adjustment.

Further, in a case of optical pickup device having a plurality of light receiving unit rows on the optical detector 101 and receiving a plurality of luminous fluxes by one optical detector 101, it is necessary to perform positioning of the optical detector 101 in the direction of rotation about the optical axis direction of an incident light of the optical detector 101 with high accuracy. Also in this case, because of large friction, it is difficult to improve the accuracy of position adjustment.

Furthermore, as discussed above, the adjustment board 104 and the optical unit 105 are fixed to each other with the adhesive after completion of the position adjustment of the optical detector 101 in the background art. Because of the temperature characteristic of the adhesive and shrinkage in hardening, the position of the optical detector 101 varies when the adhesive is hardened and this causes deterioration of reliability in position of the optical detector 101 after adjustment.

SUMMARY OF THE INVENTION

It is an object of the present invention to improve the accuracy in position adjustment of an optical detector relative to an optical unit and provide an optical pickup device capable of improving the reliability after the position adjustment.

The present invention is intended for a method of manufacturing an optical pickup device. The optical pickup device includes an optical detector, a substrate to which the optical detector is fixed, and an optical unit to which the substrate is fixed. The optical detector has a light receiving unit row for receiving a reflected light from an optical disk and a lead portion for outputting an electrical signal in response to the reflected light received by the light receiving unit row. The substrate has a conductor portion to which the electrical signal is inputted from the lead portion. The optical unit performs an adjustment of the reflected light entering the light receiving unit row.

According to a first aspect of the present invention, a method of manufacturing the optical pickup device includes the following steps (a) to (c). The step (a) is to fit the substrate to a predetermined position of the optical unit. The step (b), which is executed after the step (a), is to perform a position adjustment of the optical detector with the lead portion in contact with the conductor portion. The step (c) is to fix the optical detector to the substrate after completing the position adjustment in the step (b).

Since the optical detector is singly moved in the step (b), it is possible to reduce friction in the position adjustment and thereby improve the accuracy in position adjustment. Further, since the position adjustment is performed with the lead portion in contact with the conductor portion, it is possible to perform a position adjustment on the basis of the electrical signal outputted from the optical detector as conventional.

The present invention is also intended for an optical pickup device. According to a second aspect of the present invention, an optical detector included in the optical pickup device has a light receiving unit row for receiving a reflected light from an optical disk and a lead portion for outputting an electrical signal in response to the reflected light received by the light receiving unit row, and is fixed to a predetermined position of a substrate. Further, the optical detector has at least one dent or projection used for fitting a probe which presses the optical detector to the substrate.

In the step of performing the position adjustment of the optical detector in the process for manufacturing the optical pickup device, it is possible to perform the position adjustment of the optical detector with higher accuracy by fitting the probe which is used for moving the optical detector onto the dent or projection.

These and other objects, features, aspects and advantages of the present invention will become more apparent from the following detailed description of the present invention when taken in conjunction with the accompanying drawings.

DESCRIPTION OF THE PREFERRED EMBODIMENTS

<The First Preferred Embodiment>

Figure 1:
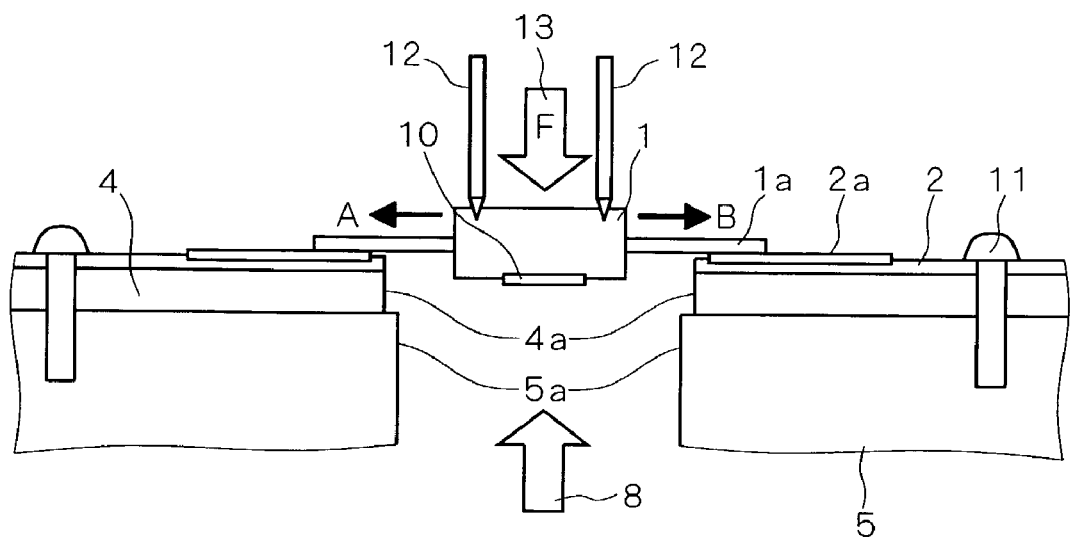
FIG. 1 is a sectional side elevation showing the state of position adjustment of an optical detector in a process for manufacturing an optical pickup device in accordance with a first preferred embodiment of the present invention.

FIG. 1 is a sectional side elevation showing the state of position adjustment of an optical detector in a process for manufacturing an optical pickup device in accordance with the first preferred embodiment of the present invention. In FIG. 1, reference numeral 1 denotes an optical detector which receives a light signal which is a reflected light from an optical disk and converts the light signal into an electrical signal corresponding thereto, and reference sign 1a denotes a lead portion for outputting the electrical signal from the optical detector 1. Further, reference numeral 10 denotes a light receiving unit row consisting of one or more light receiving units included in a light receiving surface of the optical detector 1 which receives the reflected light, and the reflected light is received by the light receiving unit row 10.

Reference numeral 2 denotes a flexible substrate (FPC) having a conductor portion 2a to which the electrical signal outputted from the lead portion 1a of the optical detector 1 is inputted. Numeral 4 denotes an auxiliary board made of a material for maintaining the shape and strength of the FPC 2, such as iron, to which the FPC 102 is attached with a not-shown adhesive. Numeral 5 denotes an optical unit in which not-shown optical parts and the like are provided, serving to adjust the reflected light entering the optical detector 1. Reference signs 4a and 5a represent light-transmitting holes provided in the auxiliary board 4 and the optical unit 5, respectively, and a reflected light 8 from the optical disk enters the optical detector 1 through the light-transmitting holes 4a and 5a. Numeral 11 denotes a screw used for fixing the FPC 2 and the auxiliary board 4 to the optical unit 5.

Further, reference numeral 12 denotes a probe used for adjusting the position of the optical detector 1 while pressing the optical detector 1 to the side of the FPC 2, and an arrow 13 indicates a force of the probe 12 to press the optical detector 1.

Figure 2:
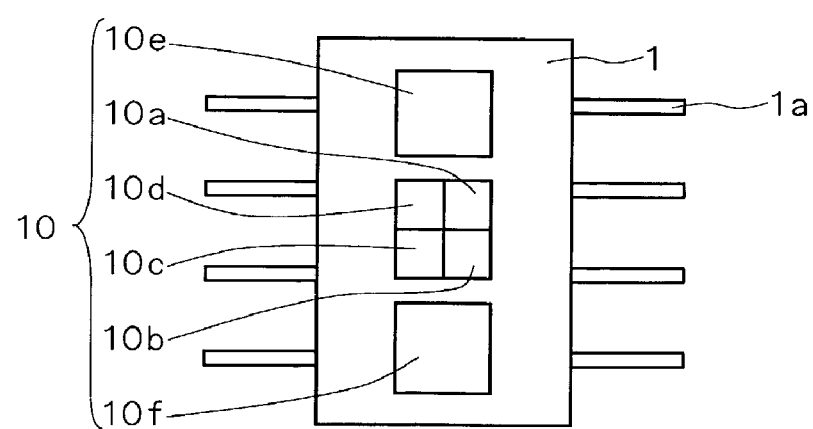
FIG. 2 is a view showing a light receiving surface of the optical detector of the optical pickup device in accordance with the first preferred embodiment of the present invention.

FIG. 2 is a view showing a surface (light receiving surface) of the optical detector 1 of FIG. 1 having the light receiving unit row 10. In FIG. 2, reference signs 10a to 10f denote light receiving units constituting the light receiving unit row 10. The position adjustment of the optical detector 1 is performed so that the central luminous flux of the reflected light 8 from the optical disk should be received in the center portion of the light receiving units 10a to 10d.

Figure 3:
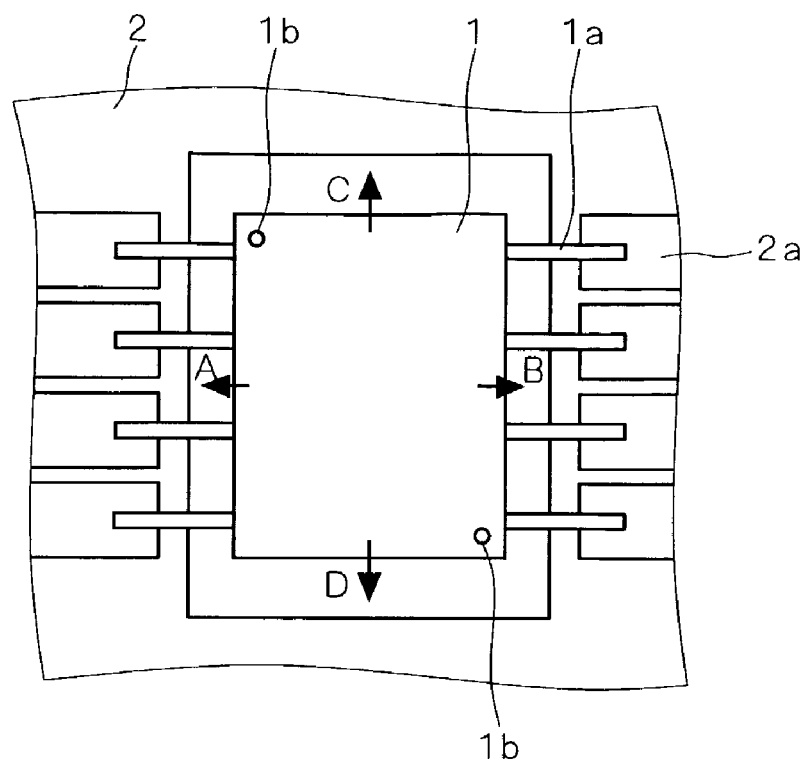
FIG. 3 is an enlarged plan view of principal part of the optical detector and an FPC in the optical pickup device in accordance with the first preferred embodiment of the present invention.

FIG. 3 is an enlarged plan view of principal part of the optical detector 1 and the FPC 2 shown in FIG. 1. In FIG. 3, reference sign 1b denotes a dent used for fitting the probe 12. Further, as can be seen from FIG. 1, the dents 1b are provided in a surface of the optical detector 1 opposite to the light receiving surface (in other words, a surface opposite to the side of the FPC 2, referred hereinafter to as "upper surface"). As shown in FIG. 3, the dents 1b are arranged one by one near each of a pair of corners diagonally opposite to each other in the surface opposite to the light receiving surface. The probe 12 is put onto the dent 1b and moved in, e.g., directions of A, B, C and D, to perform the position adjustment. Putting the probe 12 onto the dent 1*b* allows more accurate position adjustment of the optical detector 1. Further, the position adjustment is performed while the lead portions 1*a* of the optical detector 1 are brought into contact with the conductor portions 2*a* of the FPC 2 by pressing the optical detector 1 by a predetermined force with the probes 12.

Hereafter, discussion will be made on a process for manufacturing the optical pickup device in the first preferred embodiment. In the first preferred embodiment, unlike in the background-art manufacturing process, the FPC 2 and the auxiliary board 4 to which the FPC 2 is attached are fixed onto the optical unit 5 with the screws 11 before fixing the optical detector 1 to the FPC 2.

After that, the probes 12 are put onto the dents 1*b* in the upper surface of the optical detector 1, thereby pressing the optical detector 1 to the FPC 2, to bring the lead portions 1*a* into contact with the conductor portions 2*a*. At that time, it is preferable that the dents 1*b* should be arranged at certain positions so that the initial position of the optical detector 1 can be determined with high accuracy. Then, the probes 12 are moved in that state, thereby moving the optical detector 1 in, e.g., directions of A to D, to adjust the position of the optical detector 1. Since the friction between the optical detector 1 alone and the FPC 2 is small, it is possible to perform the position adjustment of the optical detector 1 with high accuracy in this case.

Usually, the position adjustment of the optical detector 1 is performed while the electrical signal outputted from the optical detector 1 is observed through the FPC 2, and the optimal position is determined on the basis of the electrical signal. In the position adjustment of the optical detector 1 of the first preferred embodiment, the lead portions 1*a* of the optical detector 1 are not soldered onto the conductor portions 2*a* of the FPC 2. Since the lead portions 1*a* and the conductor portions 2*a*, however, are brought into contact with each other by pressing the optical detector 1 to the FPC 2 with the probes 12, it is possible to perform the position adjustment on the basis of the electrical signal outputted from the optical detector 1 without any problems.

Then, after determining the optimal position of the optical detector 1, the lead portions 1*a* and the conductor portions 2*a* are fixed to each other by soldering. Since the solder is superior in temperature characteristic to the adhesive, the reliability after adjustment is also improved.

As discussed above in the first preferred embodiment, since the FPC 2 and the auxiliary board 4 is fixed to the optical unit 5 in advance before the position adjustment of the optical detector 1 and the optical detector 1 is singly adjusted in position, it is possible to reduce the friction of the optical detector 1 in the position adjustment and improve the accuracy of position adjustment. Further, since the lead portions 1*a* and the conductor portions 2*a* are brought into contact with each other by pressing the optical detector 1 to the FPC 2 with the probes 12 in the position adjustment, the position adjustment can be performed on the basis of the electrical signal outputted from the optical detector 1 as conventional. Furthermore, since the optical detector 1 is fixed by soldering after the position adjustment, the reliability in position of the optical detector 1 after the position adjustment is improved as comparison with the case of fixing with the adhesive after the position adjustment like in the background art.

Though FIG. 3 shows the structure where the dents 1*b* used for fitting the probes 12 are arranged one by one near each of a pair of corners diagonally opposite to each other in the upper surface of the optical detector 1, the position and the number of dents 1*b* are not limited to the above case, and any position and any number can be chosen only if the optical detector 1 can be adjusted in position while being pressed by the probes 12.

Figure 10:
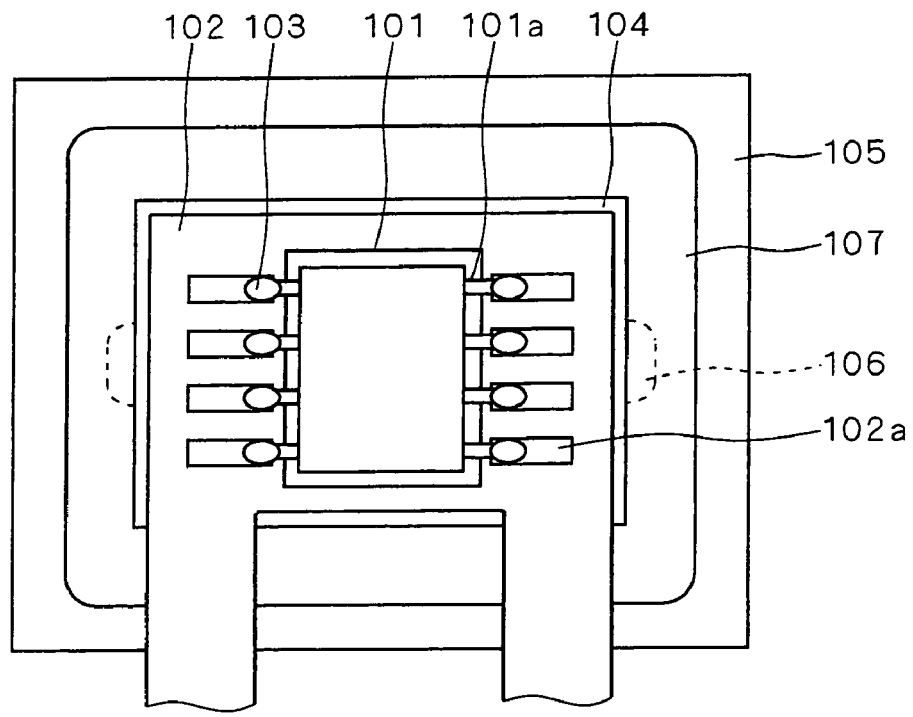
FIG. 10 is a plan view showing an optical pickup device in the background art.
Figure 11:
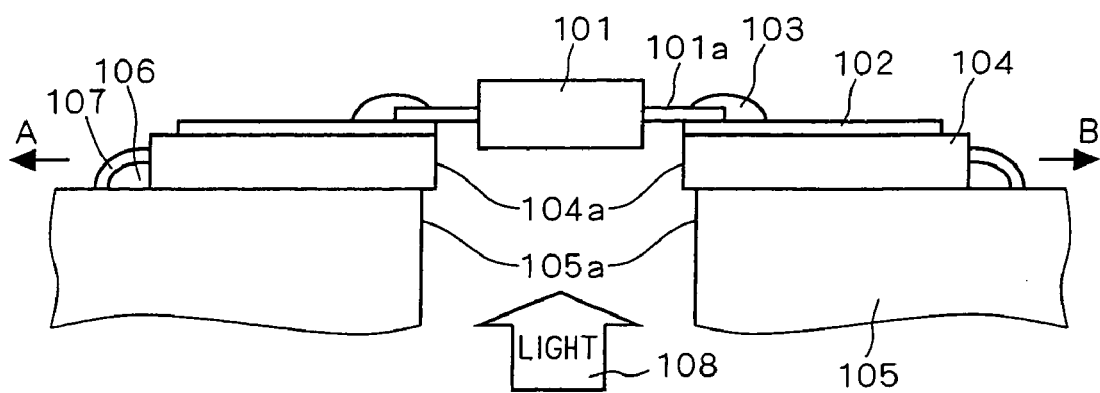
FIG. 11 is a sectional side elevation showing the optical pickup device in the background art.

Further, though FIG. 1 shows the case where the screw 11 is used as means to fix the FPC 2 and the auxiliary board 4 to the optical unit 5 in advance before the position adjustment of the optical detector 1, other fixing means which allows firm fixing, such as adhesives, may be used. In the background-art method of manufacturing the optical pickup device shown in FIGS. 10 and 11, since fine adjustment in positional relation between the optical unit 105 and the adjustment board 104 is performed, the fixing thereof can be made only by the adhesive. In contrast, since the auxiliary board 4 is fixed to the optical unit 5 in advance in the first preferred embodiment, the screws 11 and the like can be used and it is advantageous that there are broad options of means for fixing between the auxiliary board 4 and the optical unit 5.

<The Second Preferred Embodiment>

Though the first preferred embodiment shows the structure where the optical detector 1 is provided with the dents 1*b* used for fitting the probes 12 on the side opposite to the FPC 2, the optical detector 1 may be provided with projections, instead of the dents 1*b*, depending on the shape of the probe 12.

Figure 4:
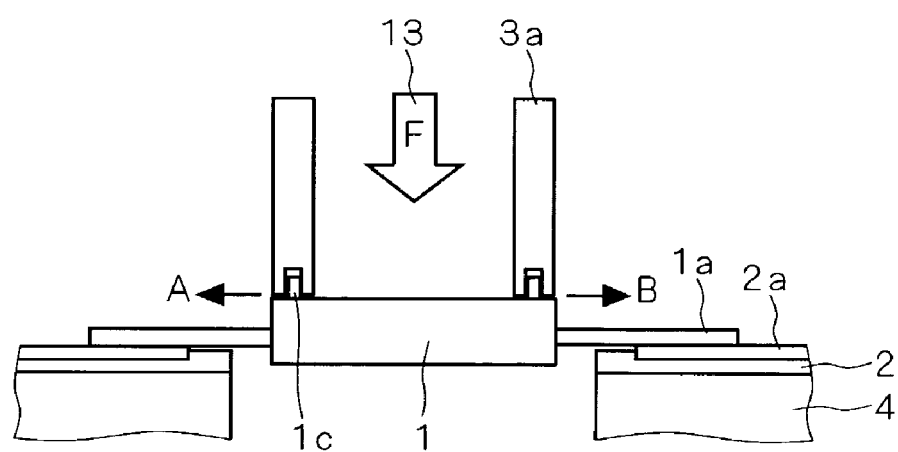
FIG. 4 is an enlarged sectional side elevation of principal part of the optical detector and the FPC in an optical pickup device in accordance with a second preferred embodiment of the present invention.

FIG. 4 is an enlarged sectional side elevation of principal part of the optical detector 1 and the FPC 2 in accordance with the second preferred embodiment of the present invention. Reference numeral 12 denotes the probe to press the optical detector 1 to the FPC 2 for the position adjustment, and reference sign 1*c* denotes a projection to hook the probe 12 or to be held by the probe 12. The optical detector 1 is pressed by the probe 12 through the projection 1*c* to bring the lead portions 1*a* of the optical detector 1 into contact with the conductor portions 2*a* of the FPC 2 and is adjusted in position by moving the probe 12. By putting the probe 12 onto the projection 1*c*, it is possible to perform the position adjustment of the optical detector 1 with higher accuracy.

Further, providing projections, instead of dents, for portions of the optical detector 1 to which the probes 12 are fitted allows broad options of arrangement. For example, there may be a structure, shown in FIG. 5, where the projections 1*c* are provided on the side surfaces of the optical detector 1. In the case where the portions to which the probes 12 are fitted are dents, like in the first preferred embodiment, it is difficult to perform the position adjustment of the optical detector 1 by using the probes 12 if the dents are provided on the side surfaces of the optical detector 1. In the case, however, where the portions to which the probes 12 are fitted are projections, even if the projections 1*c* are provided on the side surfaces of the optical detector 1 as shown in FIG. 5, it is possible to easily perform the position adjustment of the optical detector 1 by hooking the probes 12 over the projections 1*c* or holding the projections 1*c* with the probes 12.

Figure 5:
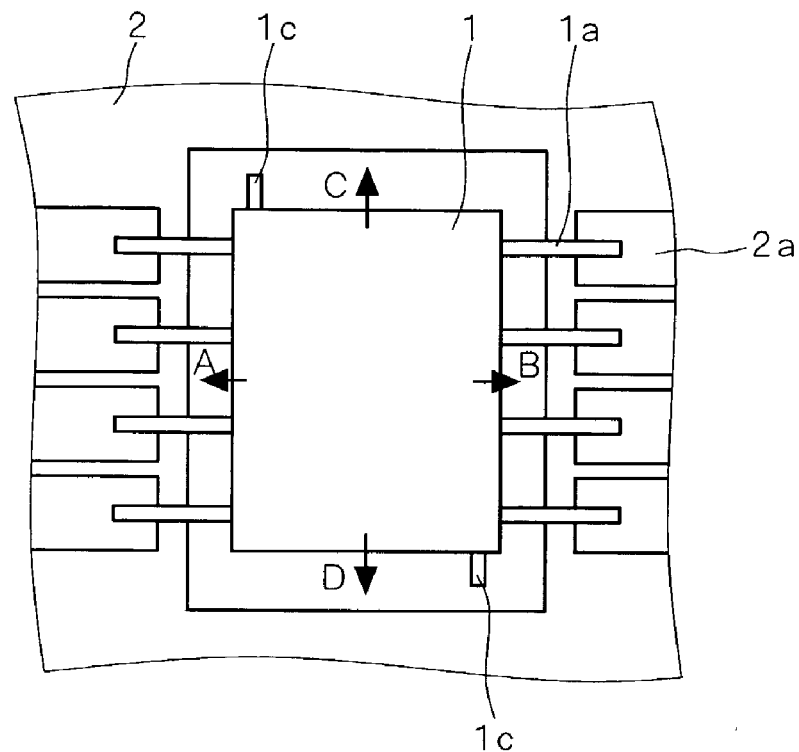
FIG. 5 is a view showing a structure where a projection of the optical detector is arranged on the side surface of the optical detector in the second preferred embodiment.

Furthermore, though FIGS. 4 and 5 show the case where the projections 1*c* are arranged one by one near each of a pair of corners diagonally opposite to each other in the upper surface of the optical detector 1, the position and the number of projections 1*c* are not limited to the above case, and any position and any number can be chosen only if the optical detector 1 can be adjusted in position while being pressed by the probes 12.

<The Third Preferred Embodiment>

Figure 6:
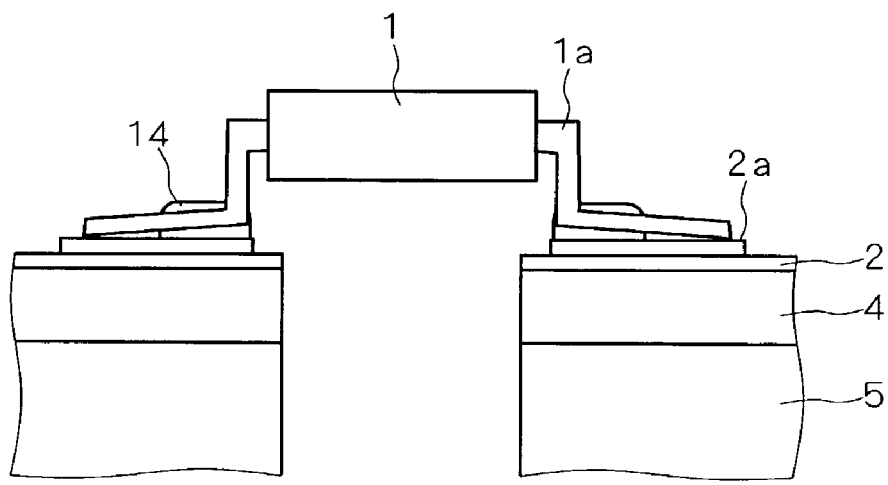
FIG. 6 is a sectional side elevation showing the state of fixation after the position adjustment of the optical detector in an optical pickup device in accordance with a third preferred embodiment of the present invention.

FIG. 6 is a sectional side elevation showing the state of fixation after the position adjustment of the optical detector 1 in the optical pickup device in accordance with the third preferred embodiment of the present invention. In FIG. 6, reference numeral 14 denotes solder used for fixing the optical detector 1 to the FPC 2 through fixing the lead portions 1a of the optical detector 1 to the conductor portions 2a of the FPC 2.

Further, other constituent elements in the method of manufacturing the optical pickup device of the third preferred embodiment are identical to those shown in FIG. 1, and discussion thereof will be omitted herein.

As shown in FIG. 6, the lead portion 1a has such a flexion as to lengthen the distance from the optical detector 1 to a contact point between the tip of the lead portion 1a and the conductor portion 2a and thereby has elasticity in an optical axis direction of the reflected light from the not-shown optical disk (reflected light axis direction). In other words, the lead portion 1a has a spring-like shape with elasticity in the reflected light axis direction. Therefore, by changing the strength of a force 13 which presses the optical detector 1 with probe 12 in the position adjustment of the optical detector 1, it is possible to change the position of the optical detector 1 in the reflected light axis direction.

Specifically, in the third preferred embodiment, the position adjustment of the optical detector 1 in the optical axis direction is performed by adjusting the force to press the optical detector 1 with the probe 12 as well as the position adjustment in a direction perpendicular to the reflected light axis direction. Then, while the optical detector 1 continues to be pressed with the probe 12 in the state after the position adjustment in the optical axis direction, the flexion of the lead portion 1a is fixed with the solder 14. With this fixing, the position of the optical detector 1 in the optical axis direction remains in the adjusted position even after taking the probe 12 off the optical detector 1.

In the third preferred embodiment, since the lead portion 1a of the optical detector 1 is provided with the flexion so as to have elasticity in the reflected light axis direction, the position adjustment of the optical detector 1 in the optical axis direction can be performed by changing the force to press the optical detector 1 with the probe 12. In other words, since the three-dimensional adjustment becomes possible, it is not necessary to adjust the optical parts such as lenses in the optical unit 5 in the optical axis direction. This allows improvement in manufacturing efficiency and reduction in the number of parts of an adjustment system in the optical axis direction, thereby ensuring cost reduction of the optical pickup device.

Further, the third preferred embodiment may use any structure where the lead portion 1a of the optical detector 1 has elasticity in the reflected light axis direction, and does not limit the shape of the lead portion 1a to that shown in FIG. 6.

<The Fourth Preferred Embodiment>

Figure 7:
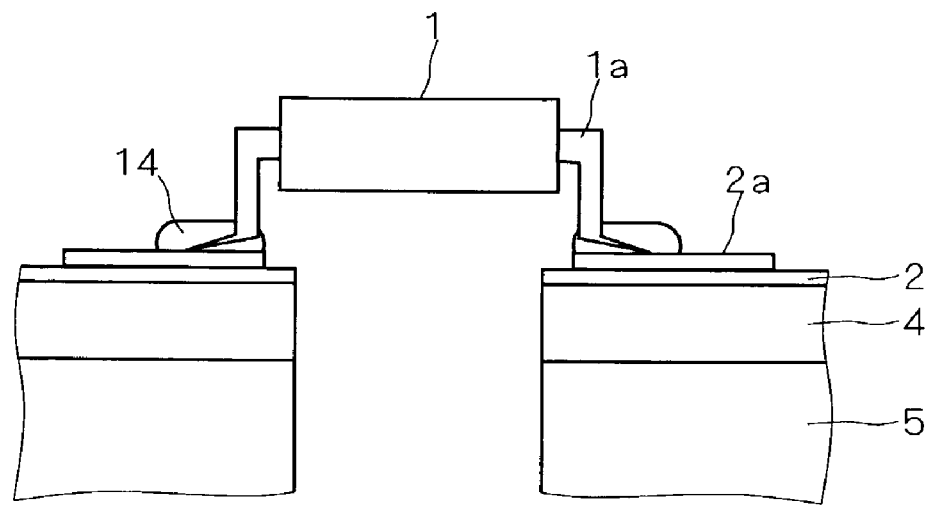
FIG. 7 is a sectional side elevation showing the state of fixation after the position adjustment of the optical detector in an optical pickup device in accordance with a fourth preferred embodiment of the present invention.

FIG. 7 is a sectional side elevation showing the state of fixation after the position adjustment of the optical detector 1 in the optical pickup device in accordance with the fourth preferred embodiment of the present invention. Like in the third preferred embodiment, the lead portion 1a has an inclined flexion and further the tip thereof is made thinner to obtain elasticity in the optical axis direction.

In the fourth preferred embodiment, like in the above-discussed third preferred embodiment, it is possible to perform the position adjustment of the optical detector 1 in the reflected light axis direction by adjusting the force applied by the probe 12, and obviously possible to produce the same effect as in the third preferred embodiment.

Further, since the tip of the lead portion 1a is made thinner, it is possible to obtain sufficient elasticity even when the distance from the optical detector 1 to the contact point between the tip of the lead portion 1a and the conductor portion 2a is shorter as comparison with the optical detector 1 shown in FIG. 6. In other words, the structure of the fourth preferred embodiment contributes to downsizing of the device.

<The Fifth Preferred Embodiment>

Figure 8:
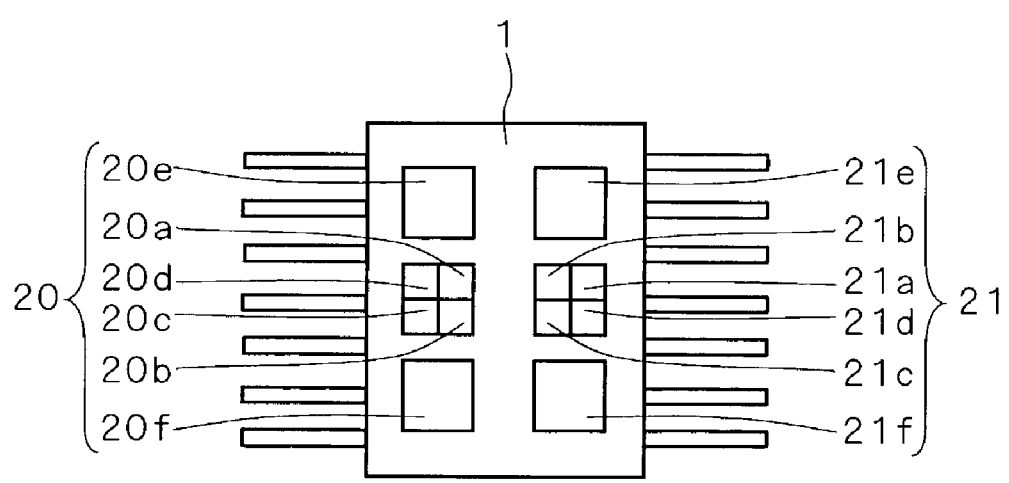
FIG. 8 is a view showing the light receiving surface of the optical detector of an optical pickup device in accordance with a fifth preferred embodiment of the present invention.

FIG. 8 is a view showing the light receiving surface of the optical detector 1 in accordance with the fifth preferred embodiment of the present invention. In FIG. 8, reference numeral 20 denotes a first light receiving unit row consisting of light receiving units 20a to 20f and numeral 21 denotes a second light receiving unit row consisting of light receiving units 21a to 21f. Specifically, the optical detector 1 of the fifth preferred embodiment has two light receiving unit rows. Further, as discussed above, when the optical detector 1 has a plurality of light receiving unit rows, it is necessary to perform alignment in direction of rotation about the reflected light axis direction with high accuracy in the position adjustment of the optical detector 1.

Figure 9:
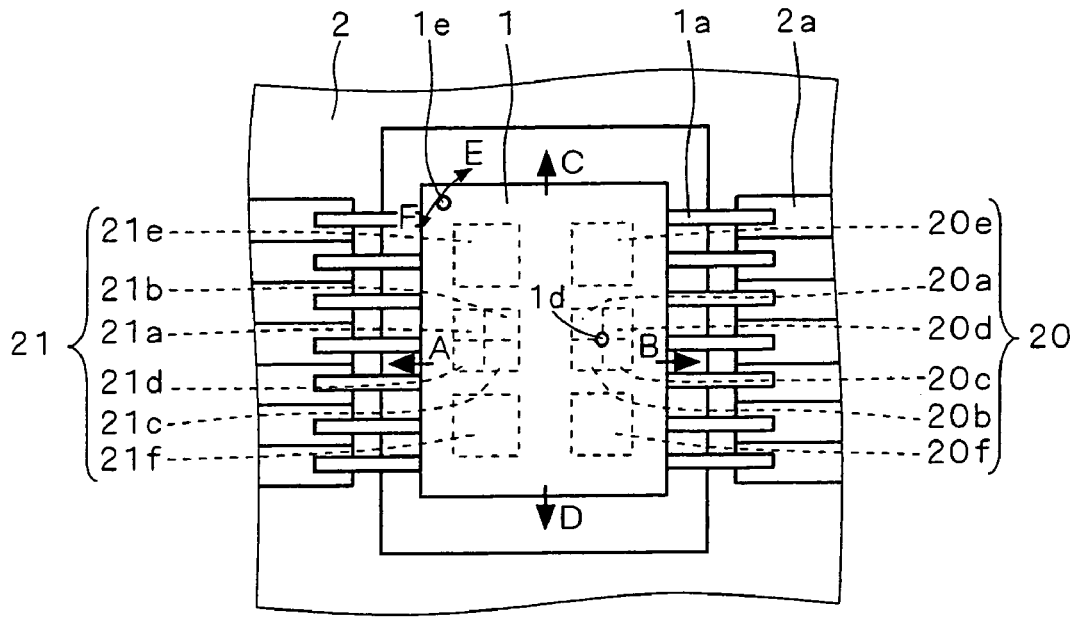
FIG. 9 is an enlarged plan view of principal part of the optical detector and the FPC in the optical pickup device in accordance with the fifth preferred embodiment of the present invention.

FIG. 9 is an enlarged plan view of principal part of the optical detector 1 and the FPC 2 in accordance with the fifth preferred embodiment of the present invention. This figure shows the upper surface of the optical detector 1, i.e., a surface opposite to the light receiving surface shown in FIG. 8. Further, reference signs 1d and 1e denote dents used for fitting the probes 12 for the position adjustment of the optical detector 1. As shown in FIG. 9, the dent 1d is arranged at the position in the upper surface of the optical detector 1 corresponding to above the center of the light receiving unit row 20 (in other words, the dent id is arranged two-dimensionally at the center of the light receiving unit row 20), and the dent 1e is arranged near a corner of the upper surface of the optical detector 1. The dents 1d and 1e are pressed by the probes 12 to bring the lead portions 1a of the optical detector 1 into contact with the conductor portions 2a of the FPC 2 and further the probes 12 are moved in, e.g., directions of A, B, C and D, to perform the position adjustment.

Further, other constituent elements in the method of manufacturing the optical pickup device of the fifth preferred embodiment are identical to those shown in FIG. 1, and discussion thereof will be omitted herein.

Discussion will be made below on the method of manufacturing the optical pickup device of the fifth preferred embodiment. First, like in the first preferred embodiment, the probes 12 are put onto the dents 1d and 1e in the upper surface of the optical detector 1, pressing the optical detector 1 to the FPC 2, to bring the lead portions la into contact with the conductor portions 2a. Then, the probes 12 are moved in that state, thereby moving the optical detector 1 in, e.g., directions of A to D, to adjust the position of the optical detector 1.

First, the position of the light receiving unit row 20 is determined. Subsequently, after determining the position of the light receiving unit row 20, only the probe 12 fitted on the dent 1e is moved in the direction F or E, without moving the probe 12 fitted on the dent 1d, to perform the position adjustment in the direction of rotation about the dent 1d as an axis, thereby determining the position of the light receiving unit row 21. In other words, it is possible to perform positioning of the light receiving unit row 21 with high accuracy, without moving the center of the light receiving unit row 20. Further, since the optical detector 1 is singly adjusted in position, the friction of the optical detector 1 in the position adjustment is small and the position adjustment can be thereby performed with high accuracy. In short, it is possible to perform positioning of the light receiving unit rows 20 and 21 accompanied by the position adjustment in the direction of rotation, i.e., the position adjustment of the optical detector 1 with high accuracy.

Furthermore, though the portions in the upper surface of the optical detector 1 to which the probes 12 are fitted are the dents in this discussion, the projections as shown in the second preferred embodiment may be used, depending on the shape of the probes 12. Also in this case, by arranging one of the projections two-dimensionally at the center of the light receiving unit row 20, it is possible to produce the same effect as above.

While the invention has been shown and described in detail, the foregoing description is in all aspects illustrative and not restrictive. It is therefore understood that numerous modifications and variations can be devised without departing from the scope of the invention.

What is claimed is:

1. A method of manufacturing an optical pickup device which comprises an optical detector having a light receiving unit row for receiving a reflected light from an optical disk and a lead portion for outputting an electrical signal in response to said reflected light received by said light receiving unit row, a substrate to which said optical detector is fixed, having a conductor portion to which said electrical signal is inputted from said lead portion, and an optical unit to which said substrate is fixed, for performing an adjustment of said reflected light entering said light receiving unit row, said method comprising the steps of:

(a) fitting said substrate to a predetermined position of said optical unit;

(b) performing a position adjustment of said optical detector relatively to said optical unit, by moving said optical detector alone with said lead portion in contact with said conductor portion after said step (a); and (c) fixing said optical detector to said substrate after completing said position adjustment in said step (b).

2. The method of manufacturing said optical pickup device according to claim 1, wherein said contact of said lead portion with said conductor portion is made by pressing said optical detector to a side of said substrate.

3. The method of manufacturing said optical pickup device according to claim 2, wherein said optical detector has at least one dent or projection used for fitting a probe which presses said optical detector to said substrate.

4. The method of manufacturing said optical pickup device according to claim 2, wherein said lead portion of said optical detector has elasticity in an optical axis direction of said reflected light, and said step (b) includes the step of:

(d) performing a position adjustment of said optical detector in said optical axis direction of said reflected light using said elasticity of said lead portion by adjusting a force of pressing said optical detector to said substrate.

5. The method of manufacturing said optical pickup device according to claim 4, wherein said lead portion of said optical detector has such a flexion as to have elasticity in said optical axis direction of said reflected light.

6. The method of manufacturing said optical pickup device according to claim 5, wherein the tip of said lead portion of said optical detector has a shape thinner than other portions.

7. The method of manufacturing said optical pickup device according to claim 3, wherein said optical detector has a plurality of said light receiving unit rows, one of said at least one dent or projection is positioned two-dimensionally at the center of any one of said plurality of light receiving unit rows, and said step (b) includes the steps of:

(e) performing a position adjustment of said light receiving unit row having said dent or projection two-dimensionally at the center thereof; and (f) performing a position adjustment of said optical detector by rotationally moving said optical detector about said dent or projection as an axis which is positioned two-dimensionally at the center of said light receiving unit row which is adjusted in position in said step (e).

8. The method of manufacturing said optical pickup device according to claim 1, wherein said step (c) is performed by soldering said lead portion of said optical detector to said conductor portion of said substrate.

* * * * *